(12) United States Patent
Duggal et al.

(10) Patent No.: US 10,318,490 B2
(45) Date of Patent: Jun. 11, 2019

(54) SYNCHRONIZING LINKED ASSETS FROM UNSYNCHRONIZED FILE FOLDERS

(71) Applicant: Adobe Inc., San Jose, CA (US)

(72) Inventors: Ashish Duggal, Delhi (IN); Sachin Soni, New Delhi (IN)

(73) Assignee: Adobe Inc., San Jose, CA (US)

( * ) Notice: Subject to any disclaimer, the term of this patent is extended or adjusted under 35 U.S.C. 154(b) by 332 days.

(21) Appl. No.: 15/335,305

(22) Filed: Oct. 26, 2016

(65) Prior Publication Data

US 2018/0113878 A1 Apr. 26, 2018

(51) Int. Cl.
G06F 16/16 (2019.01)
G06F 16/178 (2019.01)
G06F 16/182 (2019.01)

(52) U.S. Cl.
CPC ........ G06F 16/178 (2019.01); G06F 16/1844 (2019.01); G06F 16/168 (2019.01)

(58) Field of Classification Search
CPC ......... G06F 17/30174; G06F 17/30215; G06F 17/30126; G06F 17/30115; G06F 17/30575; G06F 3/04842; G06F 11/1451; G06F 11/1464; G06F 16/178; G06F 16/1844; G06F 16/168
USPC ........................................................ 707/610
See application file for complete search history.

(56) References Cited

U.S. PATENT DOCUMENTS

| | | | | |
|---|---|---|---|---|
| 2013/0282657 A1* | 10/2013 | Besen | ............... | G06F 17/30215 707/625 |
| 2014/0006350 A1* | 1/2014 | Fukui | .................... | G06F 16/192 707/632 |
| 2014/0173230 A1* | 6/2014 | Smith | ................. | H04L 67/1095 711/162 |
| 2014/0330776 A1* | 11/2014 | Chen | ....................... | H04L 67/00 707/610 |
| 2015/0288756 A1* | 10/2015 | Larabie-Belanger | ....................... | G06F 16/176 715/753 |
| 2017/0149885 A1* | 5/2017 | Kaplan | ................. | G06F 16/178 |

* cited by examiner

Primary Examiner — Evan Aspinwall
(74) Attorney, Agent, or Firm — SBMC

(57) ABSTRACT

In embodiments of synchronizing linked assets from unsynchronized file folders, files are organized in folders of a file system, where the folders include a synchronized folder and an unsynchronized folder, the synchronized folder having been selected for synchronization of the files contained in the synchronized folder, and the unsynchronized folder containing linked assets. The files contained in the synchronized folder are synchronized with a network-based memory system that stores an instantiation of the files. A synchronization service can determine that a file contained in the synchronized folder references to one or more of the linked assets contained in the unsynchronized folder. The synchronization service can then synchronize a linked asset from the unsynchronized folder automatically based on criteria associated with the file contained in the synchronized folder.

20 Claims, 6 Drawing Sheets

SYNCHRONIZING LINKED ASSETS FROM UNSYNCHRONIZED FILE FOLDERS

BACKGROUND

Many device users have electronic and computing devices, such as desktop computers, laptop computers, mobile phones, tablet computers, multimedia devices, and other similar devices. These types of computing devices are often utilized for many different computing applications, such as by creative professionals for graphic design, publication development, and various other types of artistic applications. Further, a creative professional generally uses more than one type of device, such as a desktop computer at work, a mobile phone or tablet device while commuting, and a laptop computer at home. However, not all of these computing devices are designed to efficiently process the large-sized image and graphics files that are commonly used by creative professionals who design documents and publications using graphic design, artistic, and publication applications. Typically, the image and graphics files can be several hundred megabytes in size, particularly for high-resolution images and graphics, and require substantial memory, bandwidth, and processing capabilities to synchronize and process on a computing device.

For example, a creative professional may be developing a magazine layout using a publication application on a desktop computer at work. The magazine layout may be designed with various images and graphics, which are linked files placed in the magazine layout, and these linked files may reside in different file folders on the computer than in the folder that contains the file for the magazine layout. When the file of the magazine layout is opened for viewing and editing in a user interface of a computer application designed for publication development, the magazine layout references to the linked files in the other folders to incorporate and display the various images and graphics as part of the magazine layout. The desktop computer of the user at work will likely have the memory and processing capabilities to synchronize and process the large data image and graphics files stored in the various, different file folders that have been setup by the user.

However, as the user transitions from work to commuting and then home, the mobile phone, tablet device, and/or laptop computer may not have the memory, bandwidth, battery power, data allocation, and/or processing capabilities to synchronize and process the large-data image and graphics files, yet the large-data files are each synchronized in the background processing when the magazine layout is opened on one of the mobile computing devices. This can significantly slow the processing and responsiveness of a computing device, resulting in a poor user experience and delaying time of the creative professional.

SUMMARY

This Summary introduces features and concepts of synchronizing linked assets from unsynchronized file folders, which is further described below in the Detailed Description and shown in the Figures. This Summary should not be considered to describe essential features of the claimed subject matter, nor used to determine or limit the scope of the claimed subject matter.

Synchronizing linked assets from unsynchronized file folders is described. In embodiments, files are maintained in memory of a computing device and the files are organized in folders of a file system. The folders can include synchronized folders and unsynchronized folders, where a synchronized folder has been selected for synchronization of the files contained in the synchronized folder, and a unsynchronized folder contains linked assets that are not automatically synchronized. The files contained in the synchronized folder can be synchronized with a network-based memory system (e.g., cloud-based storage) that stores an instantiation of the files. For example, a user may have several computing devices, such as a desktop computer, laptop computer, and mobile phone or tablet device. On the desktop computer that has substantial memory and processing capabilities, the user may initiate to synchronize all of the folders in the file system of the desktop computer, such as synchronized with the network-based memory service or system that maintains synchronized copies of the folders and files. Alternatively, on the laptop computer or other mobile device, the user may select to synchronize only some of the folders in the file system due to large file sizes, bandwidth limitations, data allocation usage, utilization of device battery power, and other processing resources that may be limited.

A synchronization service can be implemented as a software application on any of the different computing devices, such as part of the operating system, as part of a file manager system, or as a module of any other type of document manager. The synchronization service can determine that a file contained in a synchronized folder references to one or more linked assets contained in an unsynchronized folder, or unsynchronized folders. In implementations, synchronization information is maintained in the metadata associated with the file in the synchronized folder, and the synchronization information is accessible by the synchronization service without opening the file. The synchronization service can then automatically synchronize a linked asset from an unsynchronized folder based on criteria associated with the file contained in the synchronized folder.

In aspects of synchronizing linked assets from unsynchronized file folders, the synchronization service can be implemented to automatically synchronize a linked asset from an unsynchronized folder based on one or more criteria, including the linked asset is referenced by the file contained in the synchronized folder, or the file contained in the synchronized folder is opened, such as by an application on the computing device when initiated by a user of the device. The file contained in a synchronized folder may be a document and the synchronization service can automatically synchronize the linked asset from the unsynchronized folder based on the document being edited, such as when the document is opened for viewing or editing in an application interface.

In other aspects, the file contained in a synchronized folder may be a publication having multiple pages, and the synchronization service can automatically synchronize the linked asset from the unsynchronized folder based on a page of the publication being opened for editing and the linked asset is referenced from the page of the publication. Additionally, the synchronization service can automatically synchronize additional linked assets from the unsynchronized folder or folders based on the additional linked assets being referenced from additional pages of the publication. Alternatively, the synchronization service can automatically synchronize additional linked assets from the unsynchronized folder or folders based on the additional linked assets being referenced from subsequent pages of the publication after the opened page of the publication. The synchronization service may also be implemented to automatically synchronize a linked asset from the unsynchronized folder based on a page of the publication being opened for editing and the reference to the linked asset being user-selected from the page of the publication.

BRIEF DESCRIPTION OF THE DRAWINGS

Embodiments of synchronizing linked assets from unsynchronized file folders are described with reference to the following Figures. The same numbers may be used throughout to reference like features and components that are shown in the Figures.

DETAILED DESCRIPTION

Figure 1:
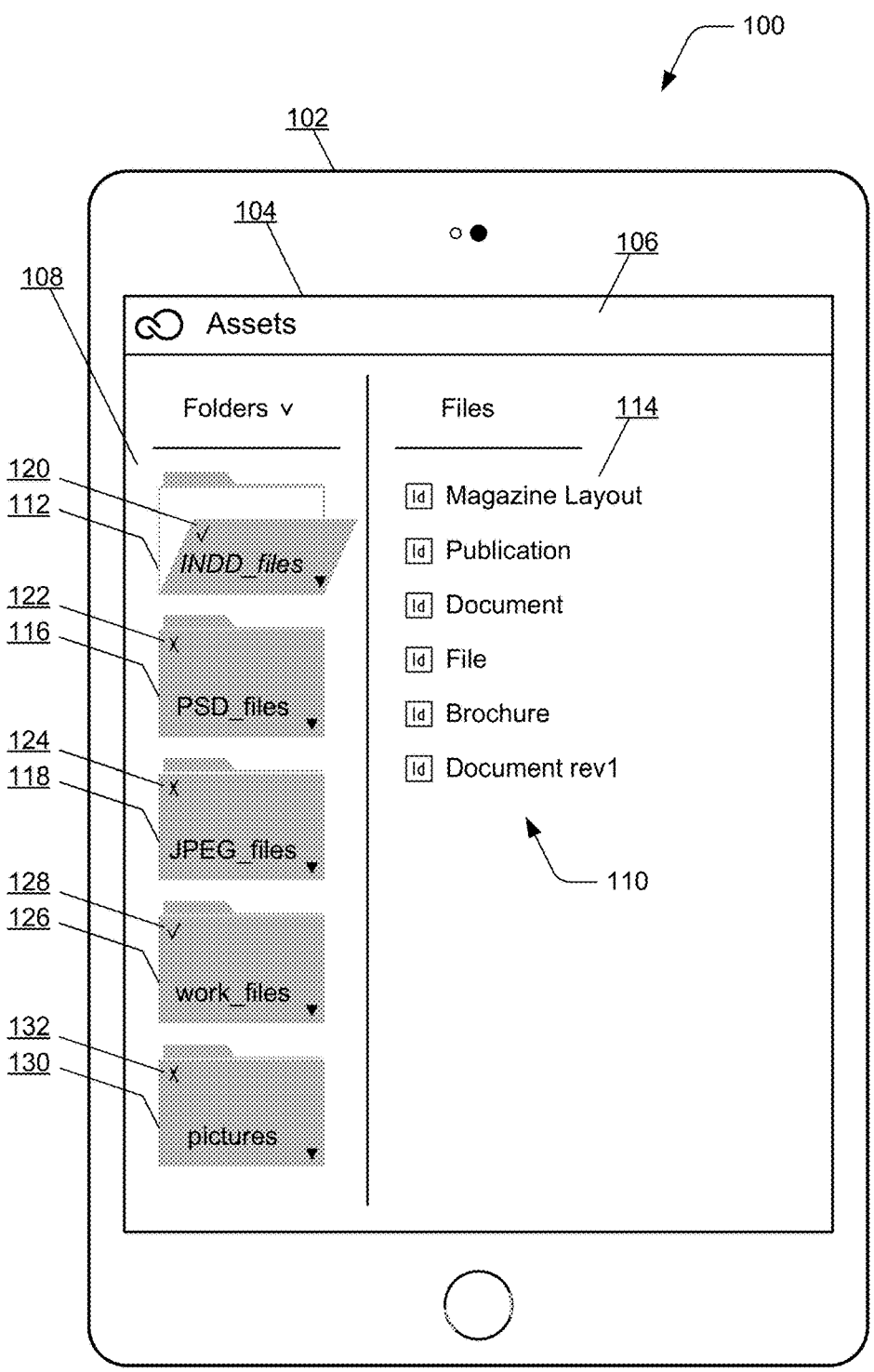
FIG. 1 illustrates an example computing device that can implement embodiments of synchronizing linked assets from unsynchronized file folders in accordance with one or more embodiments as described herein.

Embodiments are described for synchronizing linked assets from unsynchronized file folders. Much of the creative work to create publications and graphic layouts done by creative professionals involves multiple image and graphics files that are referenced as linked assets and synchronized between documents and publications. The techniques described herein provide time-savings for creative professionals, as well as file synchronization control of linked assets that are image and graphics files stored in unsynchronized file folders, yet referenced and included in a publication layout or other graphic design document. A creative professional can indicate the file folders to synchronize and tie dependencies between files in synchronized folders to linked assets (e.g., also files) in unsynchronized folders.

As referred to herein, a synchronized folder is generally described as containing files, and an unsynchronized folder is generally described as containing linked assets. However, the linked assets are also files organized and maintained in the respective file folders. The differing terminology is simply used for ease of discussion, and any of the file folders can contain files, which may be any one or more of publications, documents, linked assets, graphics, images, audio, video, or other types of files.

As noted above, the image files stored in a folder, and particularly large-sized creative graphics files, can be several hundred megabytes in size, such as for high-resolution images and graphics, and require substantial memory, bandwidth, and processing capabilities to synchronize and process on a computing device. Processing and synchronizing these types of files on a portable computing device, such as a tablet device or on a mobile phone, can also utilize substantial battery power of the device, as well as exceed data allocation limits. Accordingly, a creative professional may only designate some of the file folders for synchronization of the files, where some are indicated as synchronized folders and some are indicated as unsynchronized folders.

A file folder of creative graphics files and a file folder of image files may be designated as synchronized folders by the creative professional on a desktop computer that has the computing resources (e.g., memory, bandwidth, power, and processing capabilities) to synchronize all of the graphics and image files in the respective files folders. However, the file folders may generally be designated as unsynchronized folders on mobile devices, such as on a tablet device, a mobile phone, and a laptop computer that may not have the computing resources and/or data allocation to synchronize all of the graphics and image files in the respective folders. Even though the folders of the graphics files and the image files are designated as unsynchronized folders, the graphics files and the images files that are referenced as linked assets from a publication layout, for example, are still needed by the creative professional who may be working on the publication layout with a mobile device.

In the described techniques of synchronizing linked assets from unsynchronized file folders, the mobile device implements a synchronization service of the file system or operating system on the device. The synchronization service is implemented to determine that the file of the publication layout, for example, contained in a synchronized folder references to one or more of the linked assets (e.g., the graphics files and the images files) contained in the unsynchronized folders. The synchronization service can then synchronize the linked assets from the unsynchronized folders automatically based on criteria associated with the file of the publication layout contained in the synchronized folder so that the publication layout and the linked assets are up-to-date on each device as the creative professional continues the development work of the publication layout.

While features and concepts of synchronizing linked assets from unsynchronized file folders can be implemented in any number of different devices, systems, networks, environments, and/or configurations, embodiments of synchronizing linked assets from unsynchronized file folders are described in the context of the following example devices, systems, and methods.

FIG. 1 illustrates an example 100 of synchronizing linked assets from unsynchronized file folders, implemented with a mobile device, such as a tablet device 102 shown in this example or a mobile phone, although the techniques described herein may be implemented with any computing device, such as a desktop computer, laptop computer, or mobile device. The tablet device 102 includes a display device 104 on which application interfaces can be displayed, such as a file system interface 106 as shown in this example. A computing device, shown as the tablet device 102 in this example, can include a file system in memory of the device to maintain files organized in various file folders. In this example, the file system interface 106 shows some file folders 108 that may each have one or more files 110 of a user of the device.

The user of the tablet device 102 may be a creative professional who utilizes graphic design, artistic, and publication applications on different computing devices, such as a desktop computer, the tablet device 102, a mobile phone, and/or a laptop computer. In this example, the user has a folder 112 that contains the files 110, one of which is a file of a magazine layout 114 that the creative professional is developing with a publishing application, such as the page design and layout application Adobe InDesign™ by Adobe Systems Incorporated. An example of the magazine layout 114 is further shown and described with reference to FIG. 2.

The magazine layout 114 can be designed with various images and graphics, which are linked assets (e.g., linked files) placed in the magazine layout, and these linked assets can reside in different file folders 108 on the tablet device 102 other than in the folder 112 that contains the file 110 for the magazine layout. For example, the magazine layout 114 may reference to one or more linked creative graphics files in a folder 116, such as .PSD files editable in the imaging and design application Adobe Photoshop™ by Adobe Systems Incorporated. Alternatively or in addition, the magazine layout 114 may reference to one or more linked image files in a folder 118, such as .JPEG files of images.

As noted above, the image files in the folder 118, and particularly the creative graphics files in the folder 116, can be several hundred megabytes in size, such as for high-resolution images and graphics, and require substantial memory, bandwidth, and processing capabilities to synchronize and process on a computing device. Processing and synchronizing these types of files on a portable device, such as the tablet device 102 or on a mobile phone, can also utilize substantial battery power of the device, as well as exceed data allocation limits. Accordingly, only some of the file folders 108 may be designated for synchronization, where some are indicated as synchronized folders and some are indicated as unsynchronized folders.

For example, the folder 112 is displayed in the file system interface 106 with a synchronization indication 120 that the folder 112 is a synchronized folder, and the files 110 contained in the synchronized folder 112 can be synchronized, such as with a network-based memory system (e.g., a cloud-based storage). The creative professional who is developing the magazine layout 114 can then use several different computing devices to continue the development and design, from a desktop computer at work, to a mobile phone or tablet device while commuting, and then a laptop computer at home. The folder 112 can be designated as a synchronized folder on each of the computing devices so that the file 110 for the magazine layout 114 is up-to-date on each device as the creative professional continues the development work.

The folder 116 is displayed in the file system interface 106 with a synchronization indication 122 that the folder 116 is an unsynchronized folder. Similarly, the folder 118 is also displayed with a synchronization indication 124 that the folder 118 is an unsynchronized folder. As noted above, these two unsynchronized folders 116 and 118 contain linked assets referenced from the magazine layout 114 that references to one or more linked assets in the folder 116, such as the .PSD creative graphics files, and references to one or more linked assets in the folder 118, such as the .JPEG image files. In this example 100, a folder 126 of work files is also indicated as being a synchronized folder with a synchronization indication 128, and a folder 130 of pictures (e.g., image files) is indicated as being an unsynchronized folder with a synchronization indication 132. Additionally, a user may create a new file folder in the file system on a computing device and, based on the types of file folders that have been designated as synchronized folders or unsynchronized folders, a synchronization indication for the new file folder can be applied.

The folder 116 of graphics files and the folder 118 of image files may be designated as synchronized folders by the user on a desktop computer that has the computing resources (e.g., memory, bandwidth, power, and processing capabilities) to synchronize all of the graphics and image files in the respective folders. However, the two folders 116 and 118 may generally be designated as unsynchronized folders on mobile devices, such as the tablet device 102, a mobile phone, and a laptop computer that may not have the computing resources and/or data allocation to synchronize all of the graphics and image files in the respective folders. Even though the folder 116 of graphics files and the folder 118 of image files are designated as unsynchronized folders, the graphics files and the images files that are referenced as linked assets from the magazine layout 114 in the folder 112 are still needed by the creative professional who may be working on the magazine layout with a mobile device.

In embodiments of synchronizing linked assets from unsynchronized file folders, the tablet device 102 implements a synchronization service (e.g., as a module, a component, a software application, etc.) of the file system or operating system on the device. The synchronization service is implemented to determine that the file 110 for the magazine layout 114 contained in the synchronized folder 112 references to one or more of the linked assets contained in one or both of the unsynchronized folders 116 and 118. In the described techniques, the synchronization service can then synchronize the linked assets from the unsynchronized folders automatically based on criteria associated with the file 110 contained in the synchronized folder so that the magazine layout 114 and linked assets are up-to-date on each device as the creative professional continues the development work. These features and criteria associated with the file 110 that is contained in the synchronized folder are further shown and described with reference to FIG. 3.

Although a synchronized folder is generally described herein as containing files, and an unsynchronized folder is generally described herein as containing linked assets, the linked assets are also files organized and maintained in the respective file folders. The differing terminology is simply used for ease of discussion. Any of the file folders 108 can contain files, which may be any one or more of publications, documents, linked assets, graphics, images, audio, video, or other types of files.

Figure 2:
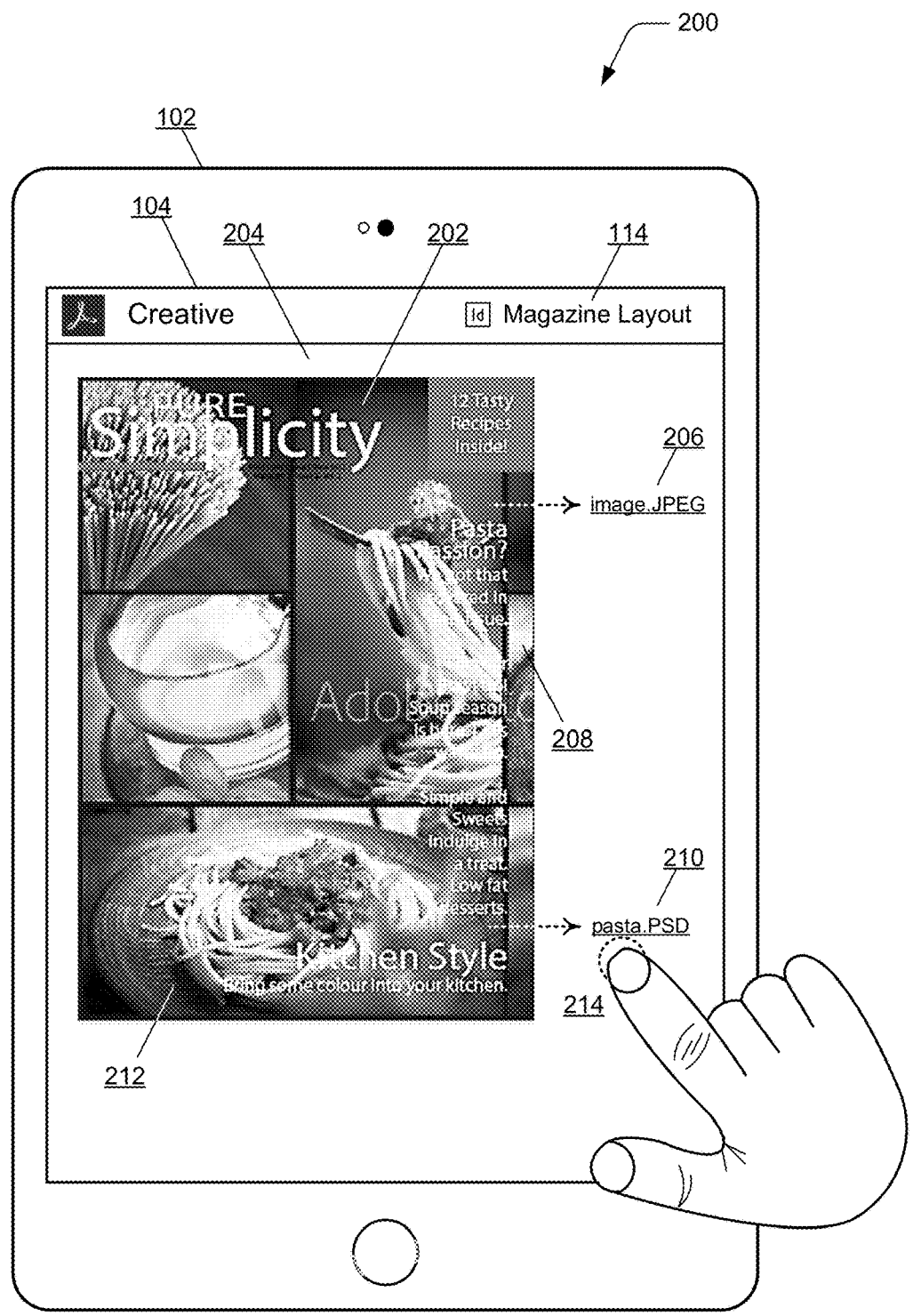
FIG. 2 further illustrates the example computing device shown in FIG. 1 in accordance with one or more embodiments as described herein.

FIG. 2 further illustrates an example 200 of synchronizing linked assets from unsynchronized file folders with reference to the tablet device 102 and the example shown and described in FIG. 1. In the example 200, a page 202 of the magazine layout 114 is shown displayed on the display device 104 of the tablet device 102 in a publishing application interface 204. A publication, such as the magazine layout 114, may be designed by a creative professional with multiple pages, and any of the pages can include references to linked assets (e.g., linked files) that are placed in a publication layout. Although the linked assets may be contained in unsynchronized folders separate from the synchronized folder 112 that contains the file 110 for the magazine layout 114, the linked assets can be automatically synchronized by association with the file for the magazine layout.

For example, the publication page 202 shown in the publishing application interface 204 includes a reference 206 to an image 208 that is displayed on the publication page 202, where the image 208 is a linked asset maintained in the unsynchronized folder 118 of .JPEG images. Similarly, the publication page 202 includes a reference 210 to a creative graphic 212 that is displayed on the publication page 202, where the creative graphic 212 is a linked asset maintained in the unsynchronized folder 116 of editable .PSD files. Additionally, a reference to a linked asset may be user-selectable to initiate opening the creative graphic for viewing and editing, such as a user selection 214 of the reference 210 to open the linked asset .PSD file for editing in the imaging and design application Adobe Photoshop™ by Adobe Systems Incorporated. In embodiments, the synchronization service automatically synchronizes the creative graphic 212 from the unsynchronized folder 116 so that the linked asset is readily available and up-to-date on any of the computing devices used by the creative professional to continue the development work of the publication.

Figure 3:
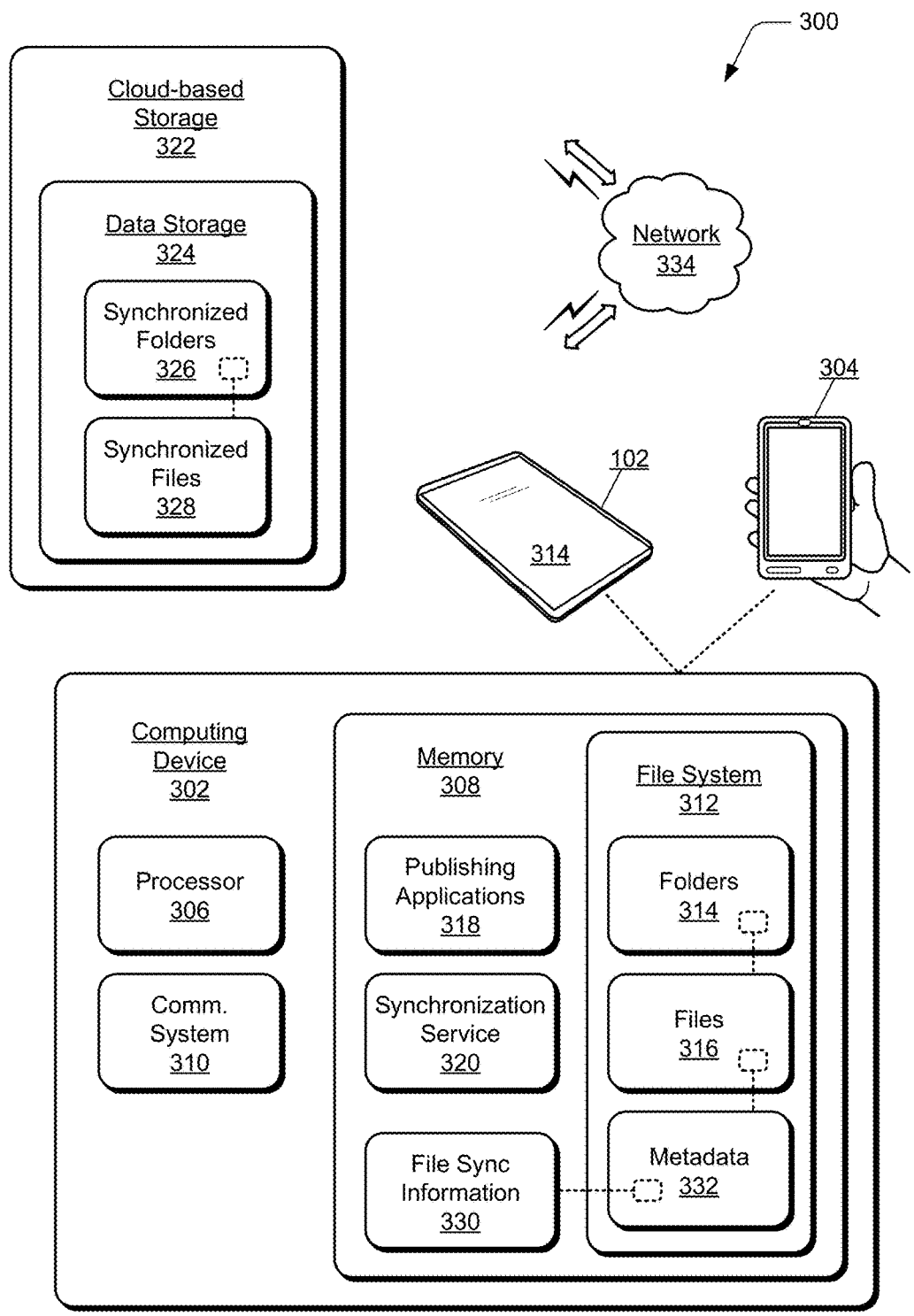
FIG. 3 illustrates an example system in which embodiments of synchronizing linked assets from unsynchronized file folders can be implemented.

FIG. 3 illustrates an example system 300 in which embodiments of synchronizing linked assets from unsynchronized file folders can be implemented. The example system 300 includes a computing device 302, such as the tablet device 102 shown in FIGS. 1 and 2, or any other type of a mobile phone 304, media playback, computing, communication, gaming, entertainment, portable electronic media device, or computer device. The computing device 302 can be implemented with various components, such as a processor 306 (or processing system) and memory 308, and with any number and combination of different components as further described with reference to the example device shown in FIG. 6. Although not shown, the computing device 302 can include a power source, such as a battery, to power the various device components. Further, the computing device 302 can include different wireless radio systems, such as for Wi-Fi, Bluetooth™, Mobile Broadband, LTE, or any other wireless communication system or format. Generally, the computing device 302 implements a communication system 310 that includes a radio device, antenna, and chipset implemented for wireless communication with other devices, networks, and services.

The computing device 302 includes a file system 312 that organizes the folders 314 of the files 316 maintained in the memory 308 of the device. The folders 314 are an example of the file folders 108, including folder 112 that contains the files 110, which are an example of the files 316, one of which is the file of the magazine layout 114 that the creative professional is developing with a publishing application 318. Additionally, the folder 116 is an example of the folders 314, and folder 116 contains creative graphics files 316, such as the creative graphic 212, which is a linked asset of the magazine layout 114 and displayed on the publication page 202. Similarly, the folder 118 is an example of the folders 314, and the folder 118 contains image files 316, such as the image 208, which is also a linked asset of the magazine layout 114 and displayed on the publication page 202.

The computing device 302 includes one or more of the publishing applications 318 that a creative professional may use to view and edit images, graphics, documents, publications, and the like. For example, a publishing application 318 can be used by a creative professional to develop the magazine layout 114, designed with various images and graphics, which are the linked assets placed in the magazine layout. The publishing applications 318 can include many different types of computer applications that are utilized to view and edit files, such as in drawing applications, graphic design, publication layouts, artistic uses, commercial and private uses, etc.

The computing device 302 also implements the synchronization service 320 in embodiments of synchronizing linked assets from unsynchronized file folders, as illustrated and described above with reference to FIGS. 1 and 2. The synchronization service 320 can be implemented as a software application or module, such as computer-executable software instructions that are executable with the processor 306 (or with a processing system) to implement embodiments described herein. The synchronization service 320 can be stored on computer-readable storage memory (e.g., the device memory 308), such as any suitable memory device or electronic data storage implemented in the computing device. Although shown as a separate module or component in memory 308, the synchronization service 320 may be integrated as a module or component of the file system 312, or with any computer applications, such as an operating system of the computing device.

The synchronization service 320 is implemented in the computing device 302 to synchronize the files 316 contained in a synchronized folder 314 with a network-based memory system that stores an instantiation (e.g., a synchronized copy) of the files. For example, the folder 112 displayed in the file system interface 106 on the tablet device 102 is a synchronized folder, and the files 110 contained in the synchronized folder 112 can be synchronized by the synchronization service 320 with a cloud-based storage 322 of the example system 300. The cloud-based storage 322, such as Adobe Creative Cloud™, is accessible by the computing devices, to include the computing device 302, the tablet device 102, and the mobile phone 304. The cloud-based storage 322 includes data storage 324 that may be implemented as any suitable memory, memory device, or electronic data storage for network-based data storage. The data storage 324 can maintain copies of the folders 314 as the synchronized folders 326 that contain copies of the files 316 as the synchronized files 328.

The cloud-based storage 322 can also be implemented with server devices that are representative of one or multiple hardware server devices of the network-based memory system. Further, the cloud-based storage 322 can be implemented with various components, such as a processing system and memory, as well as with any number and combination of different components as further described with reference to the example device shown in FIG. 6 to implement the services, applications, servers, and other cloud-based features.

As noted above, the synchronization service 320 is implemented in the computing device 302 to determine that a file 110 (or files 316) contained in a synchronized folder 112 (or folders 314) references to one or more linked assets (e.g., also files 316) contained in an unsynchronized folder 116 (or folders). The synchronization service 320 can determine that the file 110 contained in the synchronized folder 112 references to the one or more linked assets contained in the unsynchronized folder 116 from synchronization information 330 that is maintained in metadata 332 associated with the file, and the synchronization information 330 is accessible by the synchronization service 320 without opening the file. In implementations, the metadata 332 is XMP metadata (Extensible Metadata Platform), and when a linked asset is added by reference to a document or publication, the corresponding asset file information, such as the linked asset file name, file location, current synchronization settings, and other filer parameters are added to the XMP metadata 332 of the file.

The synchronization service 320 can then automatically synchronize the linked assets from the unsynchronized folder 116 (or folders) based on criteria associated with the file 110 contained in the synchronized folder 112 so that the linked assets are up-to-date on each computing device. The synchronization service 320 also leaves any additional assets contained in the unsynchronized folder or folders unsynchronized, where the additional assets are not referenced by any of the files 110 contained in the synchronized folder 112. In implementations, the synchronization service 320 can automatically synchronize a linked asset from the unsynchronized folder 116 simply based on the linked asset being referenced by the file contained in the synchronized folder 112, as described above. Alternatively, the criteria can be user-selectable to initiate when a linked asset contained in an unsynchronized folder is automatically synchronized for a file contained in a synchronized folder that references to the linked asset.

For example, the one or more linked assets (e.g., creative graphics files) in the unsynchronized folder 116 can be automatically synchronized when the file 110 contained in the synchronized folder 112 that references to the linked assets is opened for viewing or editing in the publishing application interface 204 of a publishing application 318. The linked assets that are referenced and associated with the file 110 are then up-to-date and available for viewing and editing, such as when pages 202 of the magazine layout 114 are opened for editing. In another example, the file 110 contained in the synchronized folder 112 is a document and a linked asset from the unsynchronized folder 116 can be automatically synchronized when the document that references the linked asset is not only opened for viewing, such as in the publishing application interface 204, but some aspect of the document is also edited, such as a text or layout edit. Given that some aspect of the document is being edited, the synchronization service 320 can automatically synchronize the linked asset (or linked assets) from the unsynchronized folder 116 based on the likelihood that the creative professional will also edit or update one of the linked assets in the document.

In another example, the file 110 contained in the synchronized folder 112 is a publication having multiple pages, such as multiple pages of the magazine layout 114, and a linked asset from the unsynchronized folder 116 can be automatically synchronized when a page of the publication from which the linked asset is referenced is opened for viewing or editing in a publishing application interface. For example, page four of the publication may include the reference to the linked asset, but the synchronization service 320 does not automatically synchronize the linked asset when previous publication pages one, two, or three are open for viewing. Rather, the synchronization service 320 automatically synchronizes the linked asset when page four of the publication is opened for viewing and editing. Further, the synchronization service 320 may not automatically synchronize the linked asset from the unsynchronized folder 116 until the reference to the linked asset is user-selected from the page of the publication. Additionally, the criteria can include the synchronization service 320 automatically synchronizing additional linked assets that are referenced from additional pages of the publication. Alternatively, the criteria can include the synchronization service 320 automatically synchronizing only the additional linked assets that are referenced from subsequent pages of the publication after the page of the publication that is opened.

The example system 300 also includes a network 334, and any of the devices, servers, and/or services described herein can communicate via the network, such as for data communication between the computing device 302 and the cloud-based storage 322. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

Example methods 400 and 500 are described with reference to respective FIGS. 4 and 5 in accordance with one or more embodiments of synchronizing linked assets from unsynchronized file folders. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
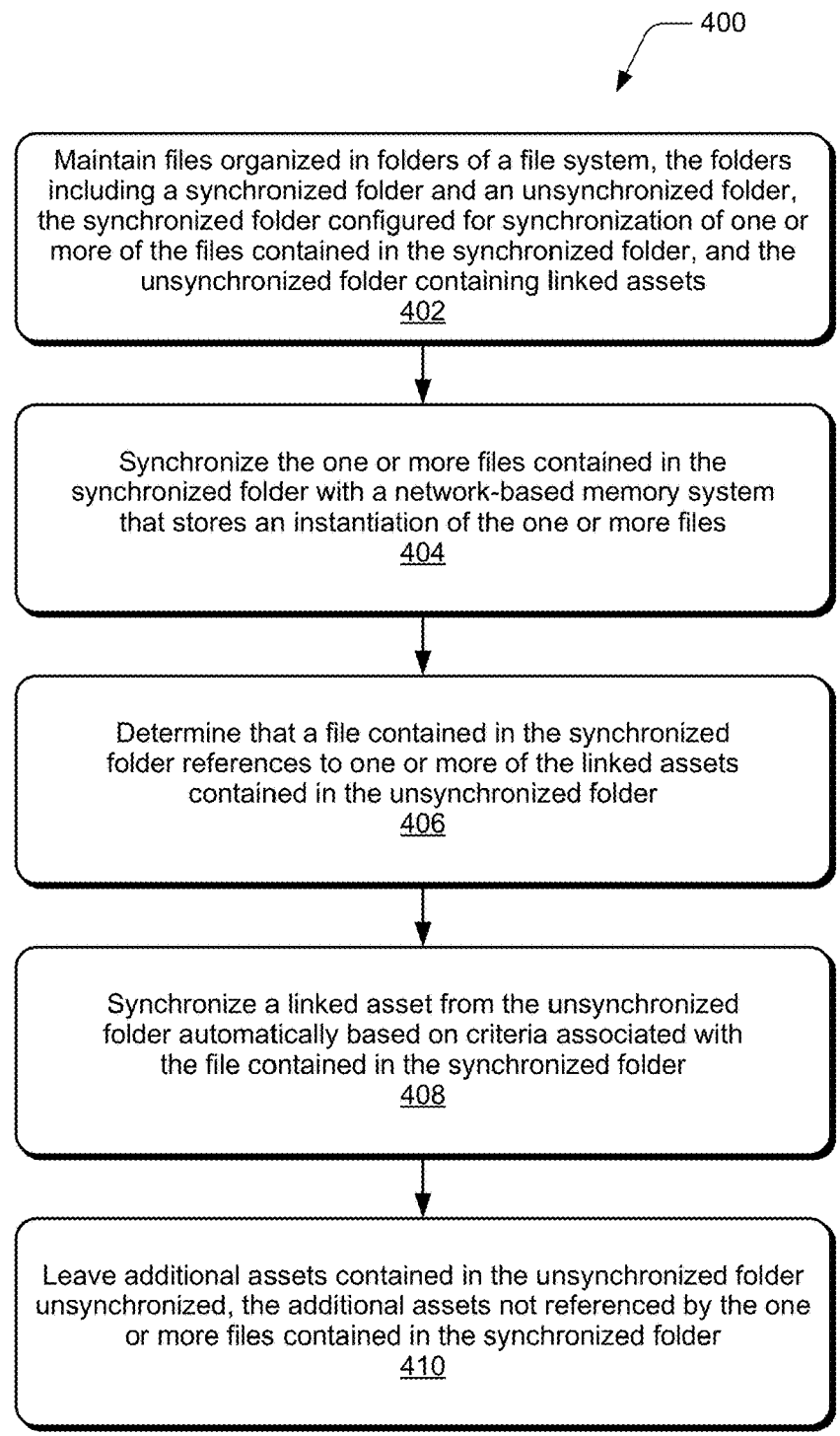
FIG. 4 illustrates an example method of synchronizing linked assets from unsynchronized file folders in accordance with one or more embodiments of the techniques described herein.

FIG. 4 illustrates an example method 400 of synchronizing linked assets from unsynchronized file folders, and is generally described with reference to the synchronization service implemented by a computing device. The order in which the method is described is not intended to be construed as a limitation, and any number or combination of the method operations can be combined in any order to implement a method, or an alternate method.

At 402, files are maintained and organized in folders of a file system, the folders including a synchronized folder and an unsynchronized folder, the synchronized folder configured for synchronization of one or more of the files contained in the synchronized folder, and the unsynchronized folder containing linked assets. For example, the memory 308 of the computing device 302 maintains the files 316 that are organized in the folders 314 of the file system 312, and the folders 314 include files 110 in the synchronized folder 112, as well as the unsynchronized folders 116 and 118 that contain linked assets, such as creative graphics and image files.

At 404, the one or more files contained in the synchronized folder are synchronized with a network-based memory system that stores an instantiation of the one or more files. For example, the synchronization service 320 implemented by the computing device 302 synchronizes the files 316 contained in a synchronized folder 314 with a network-based memory system (e.g., the cloud-based storage 322) that stores an instantiation (e.g., a synchronized copy) of the folders and files. The folder 112 displayed in the file system interface 106 on the tablet device 102 is a synchronized folder, and the files 110 contained in the synchronized folder 112 are synchronized by the synchronization service 320 with the cloud-based storage 322 to store a copy of the synchronized files 328 in the synchronized folders 326.

At 406, a determination is made that a file contained in the synchronized folder references to one or more of the linked assets contained in the unsynchronized folder. For example, the synchronization service 320 implemented by the computing device 302 determines that a file 110 (or files 316) contained in the synchronized folder 112 (or folders 314) references to one or more linked assets contained in the unsynchronized folder 116 (or folders). The synchronization service 320 determines that the file 110 contained in the synchronized folder 112 references to the one or more linked assets contained in the unsynchronized folder 116 from synchronization information 330 that is maintained in metadata 332 associated with the file, and the synchronization information 330 is accessible by the synchronization service 320 without opening the file. In implementations, the metadata 332 is XMP metadata (Extensible Metadata Platform), and when a linked asset is added as a reference to a document or publication, corresponding asset file information is added to the XMP metadata 332 of the file.

At 408, a linked asset from the unsynchronized folder is automatically synchronized based on criteria associated with the file contained in the synchronized folder. For example, the synchronization service 320 implemented by the computing device 302 automatically synchronizes the linked assets from the unsynchronized folder 116 based on criteria associated with the file 110 contained in the synchronized folder 112 so that the linked assets are up-to-date on each computing device. The synchronization service 320 can automatically synchronize a linked asset based on the criteria that the linked asset is referenced by the file 110 contained in the synchronized folder 112.

Alternatively, the synchronization service 320 can automatically synchronize a linked asset based on criteria that includes the file 110 contained in the synchronized folder 112 being opened; based on criteria of a document being edited, where the file 110 contained in the synchronized folder is the document; based on criteria of a page of a publication (e.g., the magazine layout 114) being opened for editing and the linked asset is referenced from the page 202 of the publication, where the file 110 contained in the synchronized folder 112 is the publication having multiple pages; based on criteria of a page of the publication being opened for editing and the reference to the linked asset being selected from the page of the publication. The synchronization service 320 can also automatically synchronize additional linked assets from the unsynchronized folder 116 based on the additional linked assets being referenced from additional pages of the publication, or automatically synchronize additional linked assets from the unsynchronized folder 116 based on the additional linked assets being referenced from subsequent pages of the publication after the page of the publication that has been opened.

At 410, additional assets contained in the unsynchronized folder are left unsynchronized, where the additional assets are not referenced by the one or more files contained in the synchronized folder. For example, the synchronization service 320 implemented by the computing device 302 leaves any additional assets contained in the unsynchronized folder 116 (or folders) unsynchronized, where the additional assets are not referenced by any of the files 110 contained in the synchronized folder 112.

Figure 5:
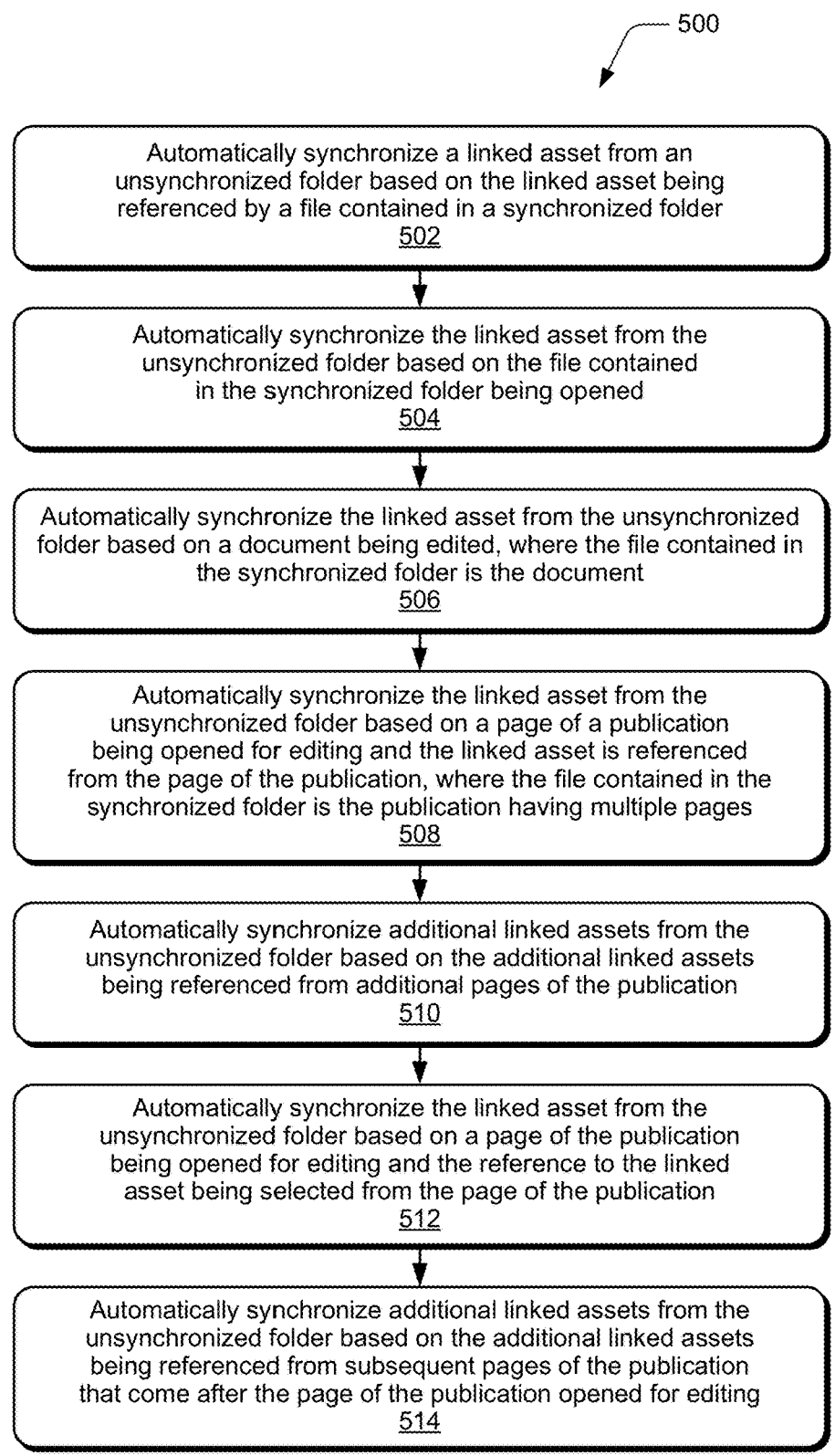
FIG. 5 illustrates another example method of synchronizing linked assets from unsynchronized file folders in accordance with one or more embodiments of the techniques described herein.

FIG. 5 illustrates an example method 500 of synchronizing linked assets from unsynchronized file folders, and is generally described with reference to the synchronization service implemented by a computing device. The order in which the method is described is not intended to be construed as a limitation, and any number or combination of the method operations can be combined in any order to implement a method, or an alternate method.

At 502, a linked asset from an unsynchronized folder is automatically synchronized based on the linked asset being referenced by a file contained in a synchronized folder. For example, the synchronization service 320 implemented by the computing device 302 automatically synchronizes a linked asset from an unsynchronized folder 116 based on the linked asset being referenced by a file 110 contained in the synchronized folder 112. When the synchronization service 320 synchronizes files, any of the files 110 that reference to linked assets in unsynchronized folders are determined and the linked assets are synchronized.

Alternatively at 504, a linked asset from the unsynchronized folder is automatically synchronized based on the file contained in the synchronized folder being opened. For example, the synchronization service 320 implemented by the computing device 302 automatically synchronizes a linked asset from the unsynchronized folder 116 based on the file 110 contained in the synchronized folder 112 being opened for viewing or editing in the publishing application interface 204 of a publishing application 318. The linked assets that are referenced and associated with the file 110 are then up-to-date and available for viewing and editing, such as when pages 202 of the magazine layout 114 are opened for editing.

Alternatively at 506, a linked asset from the unsynchronized folder is automatically synchronized based on a document being edited, where the file contained in the synchronized folder is the document. For example, the file 110 contained in the synchronized folder may be an electronic document, and the synchronization service 320 implemented by the computing device 302 automatically synchronizes the linked asset from the unsynchronized folder 116 based on the document being edited. When a creative professional opens the document in the publishing application interface 204 and edits some aspect of the document, such as the text or layout of the document, the synchronization service 320 synchronizes the linked asset from the unsynchronized folder.

Alternatively at 508, a linked asset from the unsynchronized folder is automatically synchronized based on a page of a publication being opened for editing and the linked asset is referenced from the page of the publication, where the file contained in the synchronized folder is the publication having multiple pages. For example, the file 110 contained in the synchronized folder 112 may be an electronic publication with multiple pages, and the synchronization service 320 implemented by the computing device 302 automatically synchronizes the linked asset from the unsynchronized folder 116 based on a page of the publication being opened for editing and the linked asset is referenced from the page of the publication.

At 510, additional linked assets are automatically synchronized from the unsynchronized folder based on the additional linked assets being referenced from additional pages of the publication. For example, the synchronization service 320 implemented by the computing device 302 automatically synchronizes additional linked assets from the unsynchronized folder 116 (or folders) based on the additional linked assets being referenced from additional pages of the publication.

Alternatively at 512, a linked asset from the unsynchronized folder is automatically synchronized based on a page of the publication being opened for editing and the reference to the linked asset being selected from the page of the publication. For example, the synchronization service 320 implemented by the computing device 302 automatically synchronizes the linked asset from the unsynchronized folder 116 based on a page of the publication being opened for editing and the linked asset being user-selected from the page of the publication.

At 514, additional linked assets are automatically synchronized from the unsynchronized folder based on the additional linked assets being referenced from subsequent pages of the publication that come after the page of the publication opened for editing. For example, the synchronization service 320 implemented by the computing device 302 automatically synchronizes additional linked assets from the unsynchronized folder 116 (or folders) based on the additional linked assets being referenced from subsequent pages of the publication that come after the page of the publication opened for editing (at 512).

Figure 6:
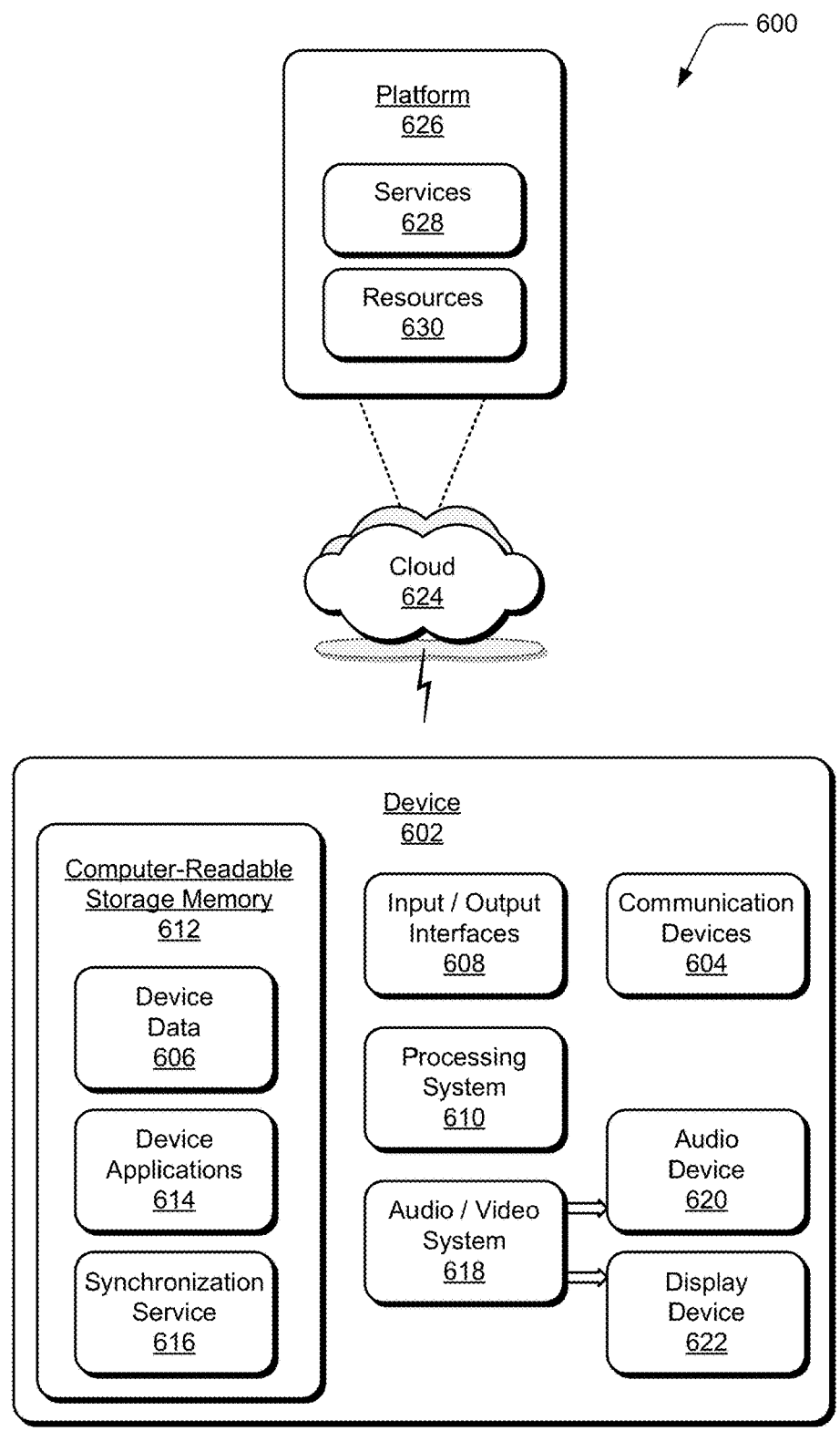
FIG. 6 illustrates an example system with an example device that can implement embodiments of synchronizing linked assets from unsynchronized file folders.

FIG. 6 illustrates an example system 600 that includes an example device 602, which can implement embodiments of synchronizing linked assets from unsynchronized file folders. The example device 602 can be implemented as any of the computing devices and/or services (e.g., server devices) described with reference to the previous FIGS. 1-5, such as any type of computing device, client device, mobile phone, tablet, communication, entertainment, gaming, media playback, and/or other type of device. For example, the tablet device 102, the computing device 302, and/or server devices of the cloud-based storage 322 may be implemented as the example device 602.

The example device 602 includes communication devices 604 that enable wired and/or wireless communication of device data 606, such as folders, files, linked assets, synchronization information, and computer applications data and content that is transferred from one computing device to another, and/or synched between multiple computing devices. The device data can include any type of audio, video, image, and/or graphic data that is generated by applications executing on the device. The communication devices 604 can also include transceivers for cellular phone communication and/or for network data communication.

The device 602 also includes input/output (I/O) interfaces 608, such as data network interfaces that provide connection and/or communication links between the device, data networks, and other devices. The I/O interfaces can be used to couple the device to any type of components, peripherals, and/or accessory devices, such as a digital camera device and/or computer input device that may be integrated with the example device 602. The I/O interfaces also include data input ports via which any type of data, media content, and/or inputs can be received, such as user inputs to the device, as well as any type of audio, video, and/or image data received from any content and/or data source.

The device 602 includes a processing system 610 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 602 may further include any type of a system bus or other data and command transfer system that couples the various components within the device. A system bus can include any one or combination of different bus structures and architectures, as well as control and data lines.

The example device 602 also includes computer-readable storage memory 612, such as data storage devices implemented in hardware that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 612 provides storage of the device data 606 and various device applications 614, such as an operating system that is maintained as a software application with the computer-readable storage memory and executed by the processing system 610. In this example, the device applications also include various computer applications and a synchronization service 616 that implements embodiments of synchronizing linked assets from unsynchronized file folders, such as when the example device 602 is implemented as the computing device 302 shown in FIG. 3. An example of the synchronization service 616 includes the synchronization service 320 that is implemented by the computing device 302 and/or by the cloud-based storage 322, as described with reference to FIG. 3.

The device 602 also includes an audio and/or video system 618 that generates audio data for an audio device 620 and/or generates display data for a display device 622. The audio device and/or the display device include any devices that process, display, and/or otherwise render audio, video, display, and/or image data, such as the image content of a digital photo. In implementations, the audio device and/or the display device are integrated components of the example device 602. Alternatively, the audio device and/or the display device are external, peripheral components to the example device. In embodiments, at least part of the techniques described for synchronizing linked assets from unsynchronized file folders may be implemented in a distributed system, such as over a "cloud" 624 in a platform 626. The cloud 624 includes and/or is representative of the platform 626 for services 628 and/or resources 630. For example, the services 628 may include the cloud-based storage described with reference to FIG. 3.

The platform 626 abstracts underlying functionality of hardware, such as server devices (e.g., included in the services 628) and/or software resources (e.g., included as the resources 630), and connects the example device 602 with other devices, servers, etc. The resources 630 may also include applications and/or data that can be utilized while computer processing is executed on servers that are remote from the example device 602. Additionally, the services 628 and/or the resources 630 may facilitate subscriber network services, such as over the Internet, a cellular network, or Wi-Fi network. The platform 626 may also serve to abstract and scale resources to service a demand for the resources 630 that are implemented via the platform, such as in an interconnected device embodiment with functionality distributed throughout the system 600. For example, the functionality may be implemented in part at the example device 602 as well as via the platform 626 that abstracts the functionality of the cloud 624.

Although embodiments of synchronizing linked assets from unsynchronized file folders have been described in language specific to features and/or methods, the appended claims are not necessarily limited to the specific features or methods described. Rather, the specific features and methods are disclosed as example implementations of synchronizing linked assets from unsynchronized file folders, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method of synchronizing linked assets from unsynchronized file folders, the method comprising:
maintaining files and linked assets organized in folders of a file system, the folders including a synchronized folder in which the files are synchronized and an unsynchronized folder containing the linked assets;
determining that a file contained in the synchronized folder references to one or more of the linked assets contained in the unsynchronized folder; and
synchronizing a linked asset from the unsynchronized folder automatically based on file access criteria associated with the file contained in the synchronized folder, the file access criteria associated with a likelihood of using the linked asset, and the linked asset being synchronized by overriding a designated setting that indicates assets in the unsynchronized folder are not synchronized.

2. The method as recited in claim 1, further comprising:
leaving additional assets contained in the unsynchronized folder unsynchronized, the additional assets not referenced by the one or more files contained in the synchronized folder.

3. The method as recited in claim 1, wherein said synchronizing the linked asset from the unsynchronized folder automatically based on the file access criteria of the linked asset being referenced by the file contained in the synchronized folder resulting from user-initiated access of the file effective to initiate the synchronizing the linked asset.

4. The method as recited in claim 1, wherein said synchronizing the linked asset from the unsynchronized folder automatically based on the file access criteria that includes the file contained in the synchronized folder being opened resulting in the likelihood of using the linked asset.

5. The method as recited in claim 1, wherein:
the file contained in the synchronized folder is a document; and
said synchronizing the linked asset from the unsynchronized folder automatically based on the file access criteria of the document being edited resulting in the likelihood of using the linked asset.

6. The method as recited in claim 1, wherein:
the file contained in the synchronized folder is a publication having multiple pages; and
said synchronizing the linked asset from the unsynchronized folder automatically based on the file access criteria of a page of the publication being opened for editing and the linked asset is referenced from the page of the publication.

7. The method as recited in claim 6, further comprising: synchronizing additional linked assets from the unsynchronized folder automatically based on the additional linked assets being referenced from additional pages of the publication, an additional linked asset being synchronized resulting from user-initiated access of a corresponding additional page of the publication.

8. The method as recited in claim 6, further comprising:
synchronizing additional linked assets from the unsynchronized folder automatically based on the additional linked assets being referenced from subsequent pages of the publication after the page of the publication that is opened.

9. The method as recited in claim 1, wherein:
the file contained in the synchronized folder is a publication having multiple pages; and
said synchronizing the linked asset from the unsynchronized folder automatically based on the file access criteria of a page of the publication being opened for editing and the reference to the linked asset being selected from the page of the publication.

10. A computing device implemented for synchronizing linked assets from unsynchronized file folders, the computing device comprising:
a memory configured to maintain files and linked assets organized in folders of a file system, the folders including a synchronized folder in which the files are synchronized and an unsynchronized folder containing the linked assets for selective synchronization based on file access criteria associated with one or more of the files contained in the synchronized folder;
a processor system configured to execute a synchronization service as a computer application implemented to:
determine that a file contained in the synchronized folder references to one or more of the linked assets contained in the unsynchronized folder; and
automatically synchronize a linked asset from the unsynchronized folder based on the file access criteria associated with the file contained in the synchronized folder, the file access criteria associated with a likelihood of the linked asset being used, and the linked asset automatically synchronized by override of a designated setting that indicates assets in the unsynchronized folder are not synchronized.

11. The computing device as recited in claim 10, wherein the synchronization service is implemented to leave additional assets contained in the unsynchronized folder unsynchronized, the additional assets not referenced by the one or more files contained in the synchronized folder.

12. The computing device as recited in claim 10, wherein the synchronization service is implemented to said automatically synchronize the linked asset from the unsynchronized folder based on the file access criteria of the linked asset being referenced by the file contained in the synchronized folder resulting from user-initiated access of the file effective to initiate the synchronization of the linked asset.

13. The computing device as recited in claim 10, wherein the synchronization service is implemented to said automatically synchronize the linked asset from the unsynchronized folder based on the file access criteria of the file contained in the synchronized folder being opened resulting in the likelihood of the linked asset being used.

14. The computing device as recited in claim 10, wherein:
the file contained in the synchronized folder is a document; and
the synchronization service is implemented to said automatically synchronize the linked asset from the unsynchronized folder based on the file access criteria of the document being edited resulting in the likelihood of the linked asset being used.

15. The computing device as recited in claim 10, wherein:
the file contained in the synchronized folder is a publication having multiple pages; and
the synchronization service is implemented to said automatically synchronize the linked asset from the unsynchronized folder based on the file access criteria of a page of the publication being opened for editing and the linked asset is referenced from the page of the publication.

16. The computing device as recited in claim 15, wherein the synchronization service is implemented to automatically synchronize additional linked assets from the unsynchronized folder based on the additional linked assets being referenced from additional pages of the publication, an additional linked asset configured for synchronization resulting from user-initiated access of a corresponding additional page of the publication.

17. The computing device as recited in claim 15, wherein the synchronization service is implemented to automatically synchronize additional linked assets from the unsynchronized folder based on the additional linked assets being referenced from subsequent pages of the publication after the page of the publication that is opened.

18. The computing device as recited in claim 10, wherein:
the file contained in the synchronized folder is a publication having multiple pages; and
the synchronization service is implemented to said automatically synchronize the linked asset from the unsynchronized folder based on the file access criteria of a page of the publication being opened for editing and the reference to the linked asset being selected from the page of the publication.

19. The computing device as recited in claim 10, wherein the synchronization service is implemented to said determine that the file contained in the synchronized folder references to the one or more linked assets contained in the unsynchronized folder from synchronization information maintained in metadata associated with the file, the synchronization information being accessible by the synchronization service without opening the file.

20. A system for synchronizing linked assets from unsynchronized file folders, the system comprising:
a memory to store files and linked assets organized in folders of a file system, the folders including a synchronized folder in which the files are synchronized and an unsynchronized folder containing the linked assets for selective synchronization based on file access criteria associated with one or more of the files contained in the synchronized folder;
means for determining that a file contained in the synchronized folder references to one or more of the linked assets contained in the unsynchronized folder; and
means for synchronizing a linked asset from the unsynchronized folder automatically based on file access criteria associated with the file contained in the synchronized folder, the file access criteria associated with a likelihood of using the linked asset, and the linked asset being synchronized by overriding a designated setting that indicates assets in the unsynchronized folder are not synchronized.

\* \* \* \* \*